March 25, 1924.

A. B. ROTH 1,488,288

COMBINED VENDING AND WEIGHING MACHINE

Filed July 31, 1923

INVENTOR
Albert B. Roth
BY
ATTORNEY

March 25, 1924.
A. B. ROTH
1,488,288
COMBINED VENDING AND WEIGHING MACHINE
Filed July 31, 1923   3 Sheets-Sheet 2
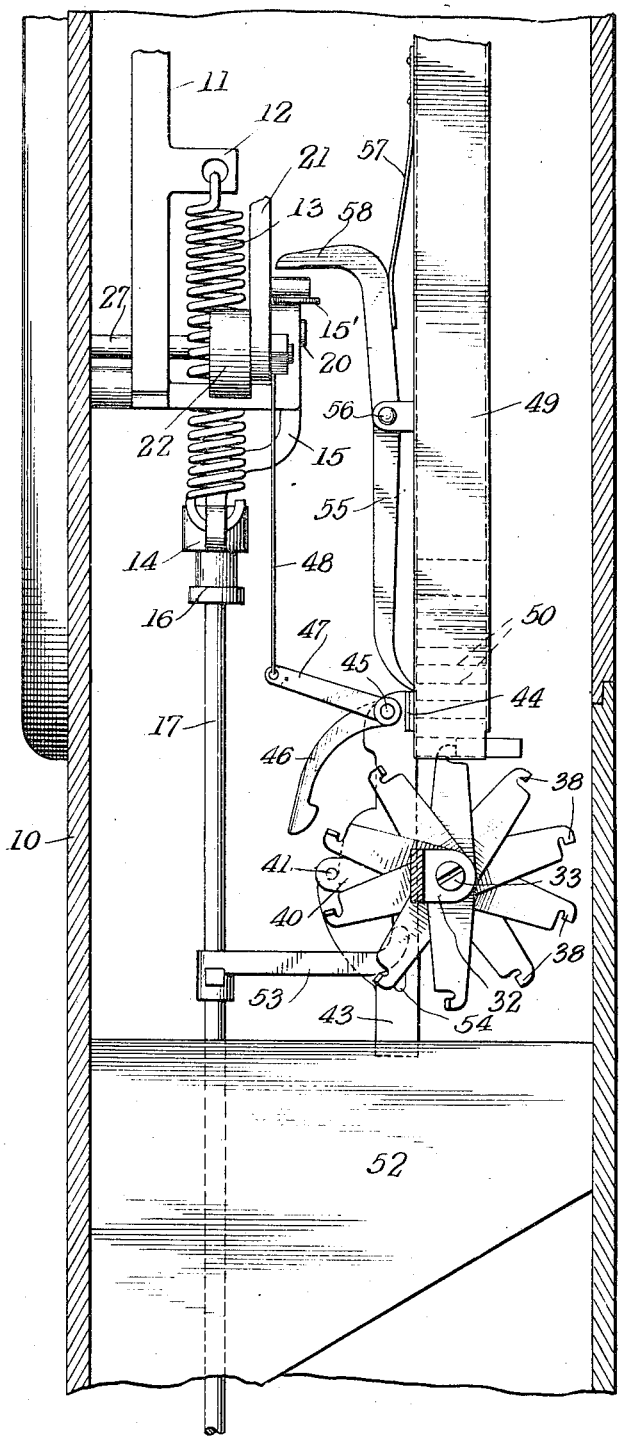
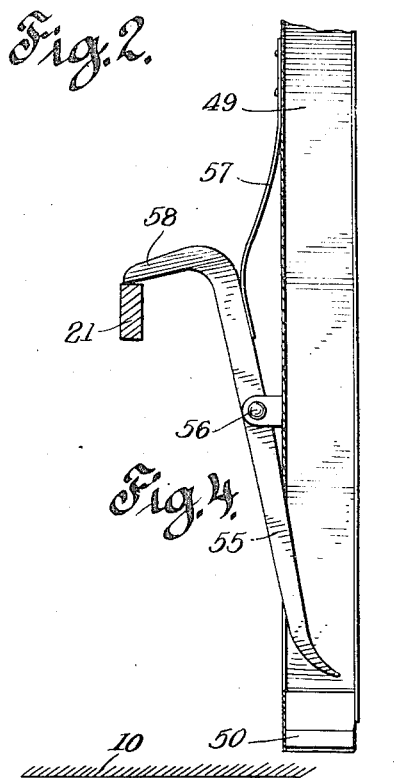
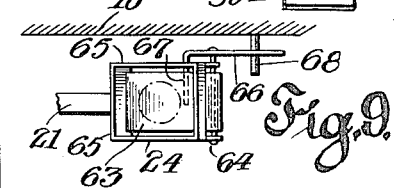
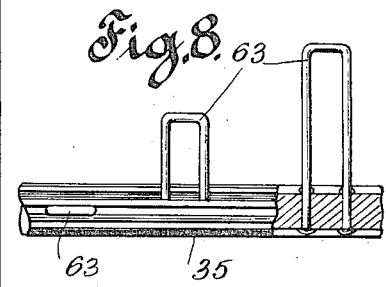
INVENTOR
Albert B. Roth
BY
his ATTORNEY March 25, 1924.
A. B. ROTH
1,488,288
COMBINED VENDING AND WEIGHING MACHINE
Filed July 31, 1923    3 Sheets-Sheet 3
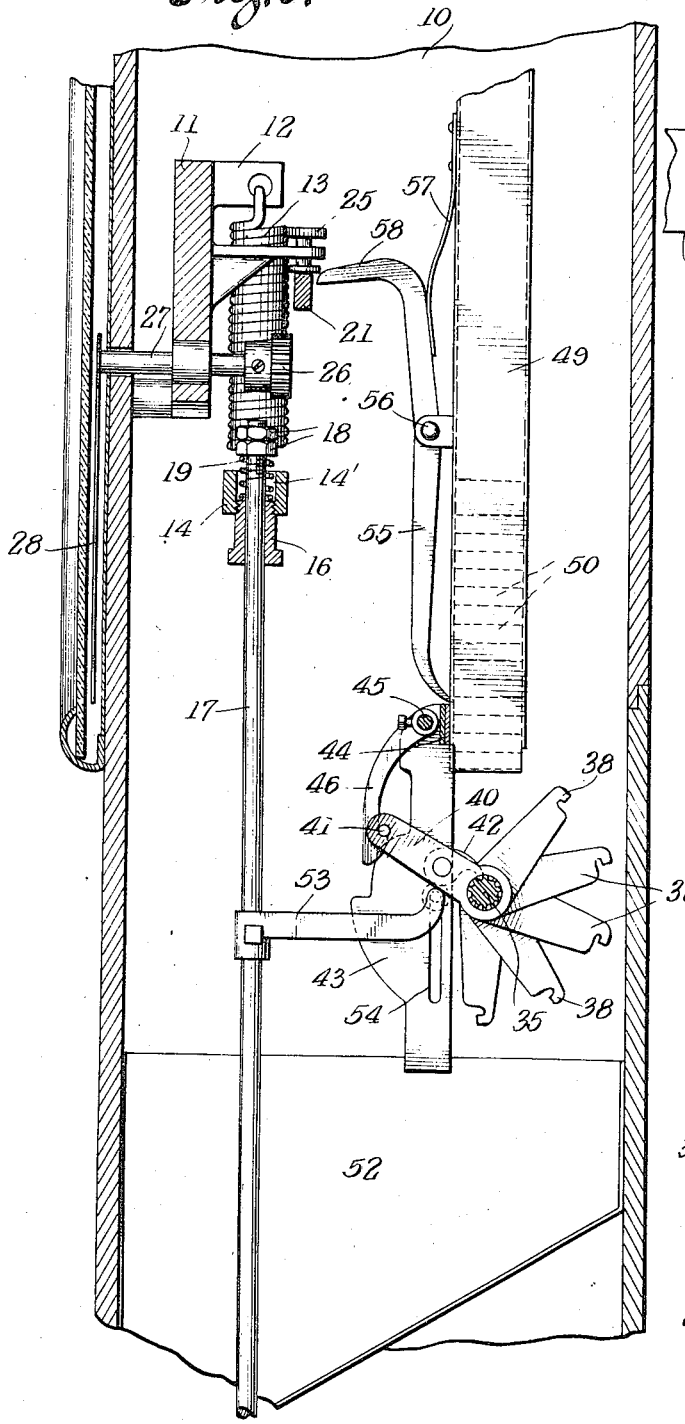
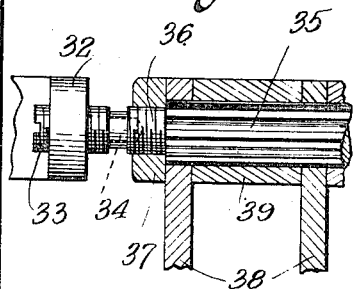
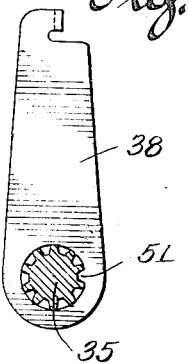
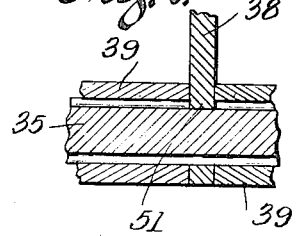
INVENTOR
Albert B. Roth
BY Howard Freeman
his ATTORNEY Patented Mar. 25, 1924.

1,488,288

UNITED STATES PATENT OFFICE.

ALBERT B. ROTH, OF BROOKLYN, NEW YORK.

COMBINED VENDING AND WEIGHING MACHINE.

Application filed July 31, 1923. Serial No. 654,812.

*To all whom it may concern:*

Be it known that I, ALBERT B. ROTH, a citizen of the United States, residing at Brooklyn, county of Kings, city of New York, and State of New York, have invented new and useful Improvements in Combined Vending and Weighing Machines, of which the following is a full, clear, and exact specification.

The device of my invention relates to vending machines and refers particularly to devices of this character combined with automatically operated devices for the determination of the weight of the operator.

The value and convenience of coin-operating devices for the sale of commodities in package form are generally recognized and they have been largely adopted as a means for such commercialization. Coin-operating scales have also been employed as an effective and attractive means for the determination of the weight of individuals.

The device of my invention is a means whereby both the delivery of a commodity and the weight of the operator are accomplished by a single coin by the weight of a person upon a scale platform.

My device requires no action upon the part of the individual except the insertion of a coin and hence is simple of operation.

It possesses no springs except those incident to the usually employed spring scales and its simplicity of construction and freedom from accidental mechanical disarrangement make it economic in construction and effective in operation.

My device may be incorporated with any form of spring scales, and hence, is of wide application.

The combination of a weight determining device and a commodity distributing device operated by a single coin presents an attractive and valuable machine for the sale and distribution of many articles, and especially those of a uniform size and shape and those in package form.

In my device, the weight of the operator upon the scale platform is automatically registered by the insertion of a coin and the commodity delivered by the return to normal of the scale platform when the operator has removed his weight therefrom.

The operation therefore consists simply of stepping upon the platform, depositing the coin and stepping off the platform, these actions registering the weight and delivering the commodity.

The above-mentioned and other advantages of my device will be evident upon a consideration of my specification with its accompanying drawings.

In the accompanying drawings, illustrating one form of the device of my invention with modified forms of some of its members, similar parts are designated by similar numerals.

Figure 2 is a longitudinal section along line 2—2 of Figure 1.

Figure 3 is a similar section on line 3—3 of Figure 1.

Figure 4 is a longitudinal section through the package reservoir having the device for indicating that the machine is empty.

Figure 5 is a detail showing the end mounting of the ejector finger rod.

Figure 6 is a detail of an ejector finger.

Figure 7 is a section on line 7—7 of Figure 1.

Figure 8 shows a modified ejector finger construction.

Figure 9 is a plan view of the coin receptacle and coin releasing device.

Figure 1:
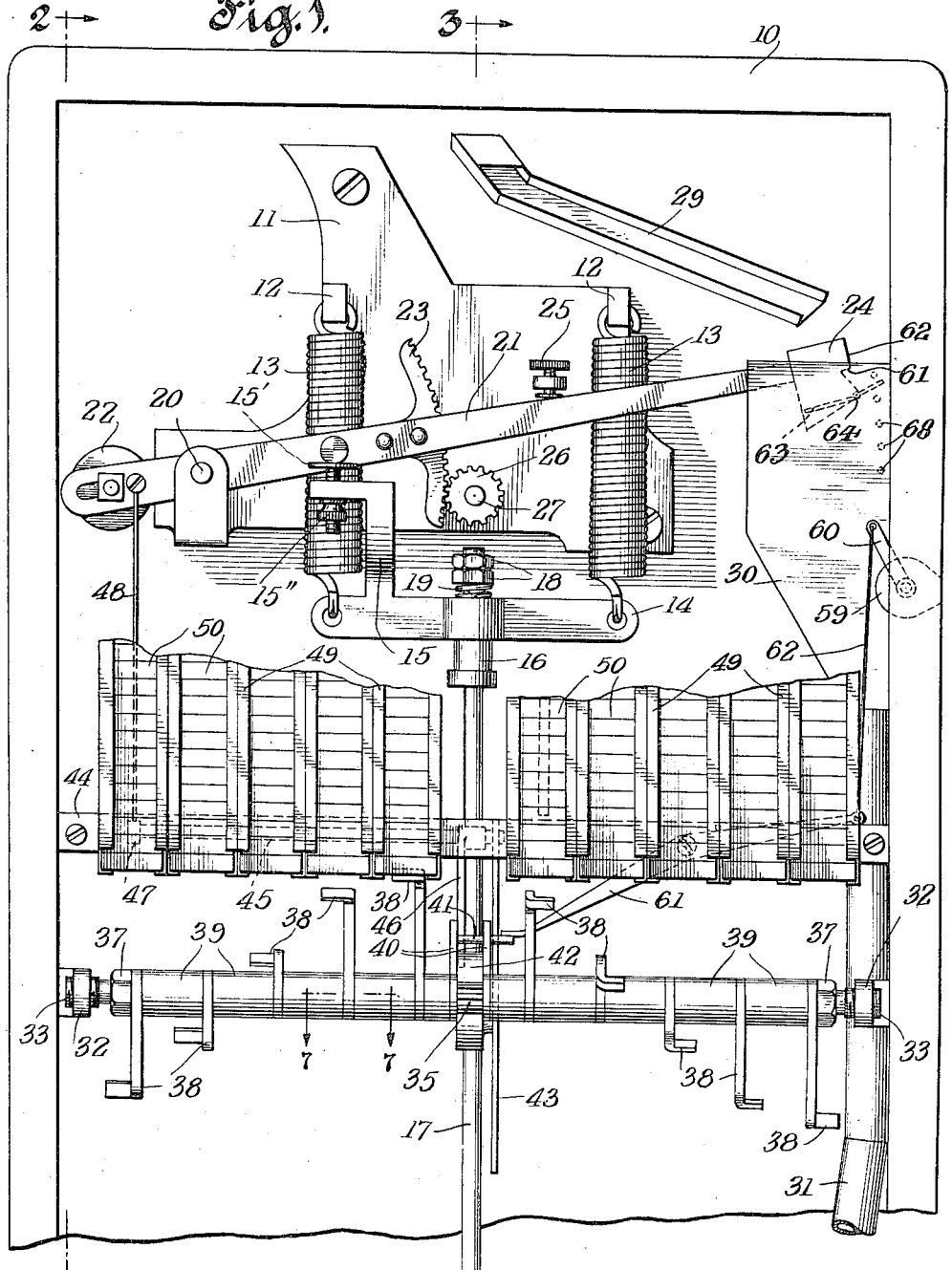
Figure 1 is a rear elevation of the upper part of a cabinet, the rear doors being omitted.

The particular form of my device, shown in the accompanying drawings, comprises a cabinet, or casing, 10 upon the upper end and on the inner side of the front wall of which is mounted a casting 11. Suspended from this casting on lugs 12 is a pair of coil springs 13, 13 from the lower ends of which hangs a bar 14 having an upwardly extending member 15. Threaded through the upper end of the member 15 is an adjustable screw 15' and its necessary locking means 15".

The bar 14 is provided at its center with an enlarged portion having a hole 14' threaded at its lower end for guiding bushing 16.

The rod 17, which is connected at its lower end to a set of compound levers and thence to the weighing platform 60, is threaded at its upper end for a pair of nuts 18, 18. A spring 19 is confined between these nuts and the upper end of the bushing 16.

Fulcrumed at 20 to the casing 11 is a balance arm 21 having on one side of the fulcrum an adjustable weight 22 and on the other a segment of a gear 23 and coin receptacle 24. An adjustable stop screw 25 limits the upward movement of the long end of the balance arm.

The coin receptacle 24 has an opening 61 in its front wall 62 and a pivotally movable bottom 63, pivoted at 64 to the side walls 65, 65. Pivotally attached at 64 is a releasing rod 66, one portion of which, 67, extends beneath the bottom 63, the other end extending beyond a plurality of trip-pins 68, 68 carried by the side wall 10. As the coin receptacle 24 descends, due to the weight of an inserted coin, the releasing rod 66 passes over the successive trip-pins 68, 68 without tilting the bottom 63, but when the arm 21 and the coin receptacle 24 are moved upwardly by the upward move of the platform 60 and the rod, or bar, 17, the releasing rod 66 catches beneath a trip-pin 68, tilting the bottom 63 and allowing the coin to pass from the receptacle 24 through its opening 61.

Meshing with the segment 23 is a gear 26 on the shaft 27 which has at the end projecting through the front wall of the cabinet an indicator, or pointer, 28.

A coin drop 29 terminates directly above the coin receptacle 24 which operates in an open topped casing 30 communicating at its lower end with a coin chute 31.

The brackets 32, 32 have adjustable screws 33, 33 which are turned down at 34 and enter into recesses in the reduced ends of the pinion rod 35, which is striated, or toothed, longitudinally. Threaded portions 36 are provided for nuts 37, 37, these nuts retaining between them, the ejector fingers 38, 38 and spacing collars 39, 39.

Central of the rod 35 and directly opposite the rod 17 are mounted a pair of arms 40, joined by a pin 41. A pawl 42 is mounted to engage the teeth on the pinion rod 35.

A bracket 43 secured to the horizontal strap 44 supports a shaft 45 having at one end a hooked finger 46 and at the other a lever 47. This last lever is connected to the balance arm 21 by means of a thin rod, or wire, 48.

Removably secured in the casing is a number of reservoirs 49 in which the packages 50 to be vended are placed. In the drawing, ten of these are shown corresponding and aligning with the ejector fingers 38, 38. The pinion rod 35, therefore, has ten longitudinal grooves and the lugs 51 on the fingers are placed in successive grooves, thus arranging the fingers radially and uniformly with relation to the rod 35.

A hopper 52 receives the packages when ejected from the reservoirs and guides them to a delivery cup (not shown).

To the rod 17 is adjustably secured a member 53 guided in a slot 54 in the bracket 43.

In order to indicate when the reservoirs may be empty, a lever 55 is pivoted at 56, the upper being pressed out by a light spring 57. The upper end of the lever is extended at right angles at 58, the lower end pressing against the packages through a slot 59 in the reservoir to which this lever is applied.

A counter 59 may be provided, the arm 60, spring pressed upward, connected to one end of a bell crank 61 by a rod, or wire, 62. The other end rests upon the extended pin 41.

In operation, a person stands on the weighing platform, thus pulling the rod 17 against the springs 13, 13, the member 53 occupying a position as shown in Figure 3. The screw 15' is thus moved down similarly. A coin dropped along 29 will fall into the receptacle 24 and overbalance the lever 21 so that it comes to rest against the screw 15'. The segment 23 has then rotated the shaft 27 and has moved the pointer around the circular dial, visually registering the weight.

The wire 48 will then tilt up the lever 47, partially rotate the shaft 45 and disengage the finger 46 from the pin 41 allowing the arms 40 to drop so that the pawl 42 finds the next groove in pinion rod 35.

When the person steps off the weighing platform, the springs 13 draw up the rod 17, the member 53 rotates back the arms 40 and the pawl 42 rotates the pinion rod 35 to its normal position. The finger 38 which, at the time, was in a position for ejecting, has been rotated its one-tenth of a revolution and a package has been ejected from the reservoir in alignment with that finger. All the other fingers will have then been advanced so that each successively will eject from each succeeding reservoir.

At the same time, the lever 21 is returned to normal and the coin is dropped through the chute 31.

As the arms 40, 40 are rotated back, the pin 41 rocks the lever 61 which pulls the wire 62 and through the lever 60 registers the counter 59.

When the reservoirs 49, 49 are empty, or nearly so, the lower end of the lever 55, encountering no packages, moves inwardly, the upper end 58 moves in the opposite direction and prevents the lever 21 from returning to normal. The weight-registering pointer will not indicate zero and the machine will appear out of order.

In the modified form of ejector fingers, U-shaped loops 63, 63 are secured by riveting to the pinion bar 35 and spacing collars are then unnecessary.

It will be seen from the above that the insertion of a single coin into the device of my invention will register the weight of the operator and deliver a commodity, combined with visual means whereby warning notice is given when a coin will no longer operate the machine, coupled with a device registering the number of commodities delivered.

I do not limit myself to the particular size, shape, number or arrangement of parts, shown and described, as these are given simply as a means for clearly describing the device of my invention.

What I claim is:—

1. In a coin-operated combined vending and weighing machine, in combination, a scale platform, a weight registering member operated by a coin and controlled by the movement of the platform, a commodity receptacle, commodity delivery means, means whereby the delivery means is locked from movement until the insertion of a coin, means whereby the insertion of a coin will unlock the delivery means and means whereby the removal of a weight from the platform will remove a commodity from the commodity receptacle.

2. In a coin-operated combined vending and weighing machine, in combination, an unlocked scale platform, means whereby the insertion of a coin and the downward movement of the platform will register the weight force of said movement, a plurality of commodity receptacles, commodity delivery means, means whereby the delivery means is locked from movement until the insertion of a coin, means whereby the insertion of a coin will unlock the delivery means and means whereby the return of the platform towards its normal position will remove a commodity from a commodity receptacle.

3. In a coin-operated combined vending and weighing machine, in combination, a scale platform, a vertically movable bar connected to said platform, means whereby a weight upon said platform will move said bar downwardly, means whereby the insertion of a coin will visually register the amount of said weight, means whereby the removal of said weight will release the coin from the registering device, a commodity receptacle, commodity delivery means, means whereby the delivery means is locked from movement until the insertion of a coin, means whereby the insertion of a coin will unlock the delivery means and means whereby the removal of said weight will cause the removal of a commodity from the receptacle.

4. In a coin-operated combined vending and weighing machine, in combination, a scale platform, a vertically movable bar connected to said platform, means whereby a weight upon said platform will move said bar downwardly, means whereby the insertion of a coin will visually register the amount of said weight, means whereby the removal of said weight will release the coin from the registering device, a plurality of commodity receptacles, commodity delivery means, means whereby the delivery means is locked from movement until the insertion of a coin, means whereby the insertion of a coin will unlock the delivery means and means whereby the upward movement of the bar will cause the removal of a commodity from a receptacle and allow its delivery.

5. In a coin-operated combined vending and weighing machine, in combination, a scale platform, spring means for retaining the platform in normal position but allowing of its downward movement when a weight is placed thereon, a vertically movable bar attached to said platform and movable therewith, a coin-controlled mechanism visually registering a weight upon the platform, a commodity receptacle, commodity delivery means, means whereby the delivery means is locked from movement until the insertion of a coin, means whereby the insertion of a coin will unlock the delivery means, means whereby the upward movement of the bar will remove a commodity from the receptacle, remove the coin from the registering device and return the registering means to normal position and visual means warning when a coin will not operate the device.

6. In a coin-operated combined vending and weighing machine, in combination, a scale platform, spring means for retaining the platform in normal position but allowing of its downward movement when a weight is placed thereon, a vertically movable bar attached to said platform and movable therewith, a coin-controlled mechanism visually registering a weight upon the platform, a plurality of commodity receptacles, means whereby the removal of the weight from the platform will deliver a commodity from one of the receptacles, cause the coin to drop from the coin-operating means and return the visual weight registering means to zero when the device is operative and means whereby the non-operativeness of the device will be indicated by a non-zero registering means when there is no weight upon the platform.

7. In a coin-operated combined vending and weighing machine, in combination, a scale platform, spring means for retaining the platform in normal position but allowing of its downward movement when a weight is placed thereon, a vertically movable bar attached to said platform and movable therewith, a coin-controlled mechanism visually registering a weight upon the platform, a plurality of commodity receptacles, a plurality of delivery members, means whereby the delivery members are locked from movement until the insertion of a coin, means whereby the insertion of a coin will unlock the delivery members, and means whereby the upward movement of the platform will cause the delivery members to remove commodities consecutively from the commodity receptacles.

8. In a coin-operated combined vending and weighing machine, in combination, a scale platform, spring means for retaining the platform in normal position but allowing of its downward movement when a weight is placed thereon, a vertically movable bar attached to said platform and movable therewith, a coin-controlled mechanism visually registering a weight upon the platform, a plurality of commodity receptacles, a plurality of delivery members, means whereby the delivery members are locked from movement until the insertion of a coin, means whereby the insertion of a coin will unlock the delivery members and means whereby the upward movement of the platform will cause the delivery members to remove commodities consecutively from the commodity receptacles, cause the removal of the coin from the coin-operating member and return the visual registering means to zero.

9. In a coin-operated combined vending and weighing machine, in combination, a scale platform, spring means for retaining the platform in normal position but allowing of its downward movement when a weight is placed thereon, a vertically movable bar attached to said platform and movable therewith, a coin-controlled mechanism visually registering a weight upon the platform, a plurality of commodity receptacles, a plurality of delivery members, means whereby the delivery members are locked from movement until the insertion of a coin, means whereby the insertion of a coin will unlock the delivery members, means whereby the upward movement of the platform will cause the delivery members to remove commodities consecutively from the commodity receptacles, cause the removal of the coin from the coin-operating member and return the visual registering means to zero, when the device is operative and visual means of warning when a coin will not operate the device.

10. In a coin-operated combined vending and weighing machine, in combination, a scale platform, a vertically movable bar connected to said platform and movable therewith, means whereby the insertion of a coin will register the amount of a weight placed upon said platform, a commodity receptacle, means whereby the downward movement of the platform will place a commodity in potential position for ejection, commodity delivery means, means whereby the delivery means is locked from movement until the insertion of a coin, means whereby the insertion of a coin will unlock the delivery means, and means whereby the upward movement of the platform will eject the commodity from the receptacle, remove the coin from the coin receptacle and return the registering means to normal position.

11. In a coin-operated combined vending and weighing machine, in combination, a scale platform, a vertically movable bar connected to said platform and movable therewith, means whereby the insertion of a coin will register the amount of a weight placed upon said platform, a commodity receptacle, means whereby the downward movement of the platform will place a commodity in potential position for ejection, commodity delivery means, means whereby the delivery means is locked from movement until the insertion of a coin, means whereby the insertion of a coin will unlock the delivery means, means whereby the upward movement of the platform will eject the commodity from the receptacle, remove the coin from the coin receptacle and return the registering means to normal position and means of warning when a coin will not operate the device.

12. In a coin-operated combined vending and weighing machine, in combination, a scale platform, a vertically movable bar connected to said platform and movable therewith, means whereby the insertion of a coin will register the amount of a weight placed upon said platform, a plurality of commodity receptacles, means whereby the downward movement of the platform will place a commodity in potential position for ejection, commodity delivery means, means whereby the delivery means is locked from movement until the insertion of a coin, means whereby the insertion of a coin will unlock the delivery means and means whereby the upward movement of the platform will eject the commodity from a receptacle and position the device for the reoperation.

13. In a coin-operated combined vending and weighing machine, in combination, a scale platform, a vertically movable bar connected to said platform and movable therewith, means whereby the insertion of a coin will register the amount of a weight placed upon said platform, a plurality of commodity receptacles, means whereby the downward movement of the platform will place a commodity in potential position for ejection, commodity delivery means, means whereby the delivery means is locked from movement until the insertion of a coin, means whereby the insertion of a coin will unlock the delivery means, means whereby the upward movement of the platform will eject the commodity from a receptacle, remove the coin from the coin receptacle and return the registering means to normal position and means for warning when a coin will not operate the device.

14. In a coin-operated combined vending and weighing machine, in combination, a scale platform, a vertically movable bar connected to said platform and movable therewith, means whereby the insertion of a coin will register the amount of a weight placed upon said platform, a plurality of commodity receptacles, means whereby the downward movement of the platform will place a commodity in potential position for ejection, commodity delivery means, means whereby the delivery means is locked from movement until the insertion of a coin, means whereby the insertion of a coin will unlock the delivery means and means whereby the upward movement of the platform will eject the commodity from a receptacle, remove the coin from the coin receptacle and return the registering means to normal position.

15. In a coin-operated combined vending and weighing machine, in combination, a scale platform, spring means for retaining the platform in normal position but allowing of its downward movement when a weight is placed thereon, a vertically movable bar attached to said platform and movable therewith, a commodity receptacle, a delivery member, means whereby the delivery member is locked from movement until the insertion of a coin, means whereby the insertion of a coin will register a weight upon the platform and release the delivery member for purposes of a commodity removal and means whereby the upward movement of the platform bar will remove a commodity from the commodity receptacle.

16. In a coin-operated combined vending and weighing machine, in combination, a scale platform, spring means for retaining the platform in normal position but allowing of its downward movement when a weight is placed thereon, a vertically movable bar attached to said platform and movable therewith, a plurality of commodity containers, a plurality of delivery members, means whereby the delivery members are locked from movement during the downward movement of the platform bar, means whereby the insertion of a coin will register a weight upon the platform and unlock the delivery members and means whereby the removal of the weight from the platform will cause a delivery member to deliver a commodity from a container.

17. In a coin-operated combined vending and weighing machine, in combination, a scale platform, spring means for retaining the platform in normal position but allowing of its downward movement when a weight is placed thereon, a vertically movable bar attached to said platform and movable therewith, a plurality of commodity containers, a plurality of delivery members, means whereby the delivery members are locked from movement during the downward movement of the platform bar, means whereby the insertion of a coin will register a weight upon the platform and unlock the delivery members and means whereby the removal of the weight from the platform will cause a delivery member to deliver a commodity from a container and return the weight registering means to zero.

18. In a coin-operated combined vending and weighing machine, in combination, a scale platform, spring means for retaining the platform in normal position but allowing of its downward movement when a weight is placed thereon, a vertically movable bar attached to said platform and movable therewith, a plurality of commodity containers, a plurality of delivery members, means whereby the delivery members are locked from movement during the downward movement of the platform bar, a coin-controlled mechanism, means whereby the placement of a coin upon the coin-controlled mechanism will register a weight upon the platform and unlock the delivery members and means whereby the upward movement of the platform bar will cause a delivery member to deliver a commodity from a container, cause the removal of the coin from the coin mechanism and return the weight registering means to zero.

19. In a coin-operated combined vending and weighing machine, in combination, a scale platform, spring means for retaining the platform in normal position but allowing of its downward movement when a weight is placed thereon, a vertically movable bar attached to said platform and movable therewith, a plurality of commodity containers, a plurality of delivery members, means whereby the delivery members are locked from movement during the downward movement of the platform bar, a coin-controlled mechanism, means whereby the placement of a coin upon the coin-controlled mechanism will register a weight upon the platform and unlock the delivery members and means whereby a plurality of upward movements of the platform bar will cause the delivery members to remove commodities consecutively from the commodity receptacles, cause the removal of the coin from the coin mechanism and return the weight registering means to zero.

Signed at New York city in the county of New York and State of New York this 27th day of July, 1923.

ALBERT B. ROTH.